United States Patent
Welchko et al.

(10) Patent No.: US 7,888,905 B2
(45) Date of Patent: Feb. 15, 2011

(54) METHOD AND SYSTEM FOR CONTROLLING A POWER INVERTER IN ELECTRIC DRIVES

(75) Inventors: Brian A. Welchko, Torrance, CA (US); Steven E. Schultz, Torrance, CA (US); Silva Hiti, Redondo Beach, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 491 days.

(21) Appl. No.: 12/013,093

(22) Filed: Jan. 11, 2008

(65) Prior Publication Data

US 2009/0179608 A1    Jul. 16, 2009

(51) Int. Cl.
*H02P 27/04* (2006.01)

(52) U.S. Cl. ............... 318/801; 318/599; 318/607; 318/807

(58) Field of Classification Search .......... 318/599, 318/606, 607, 619, 798, 801, 807, 810, 811; 363/39, 40, 41, 55, 56.01, 56.02, 95, 97, 363/98, 131, 132
See application file for complete search history.

(56) References Cited

U.S. PATENT DOCUMENTS

| | | | | |
|---|---|---|---|---|
| 5,610,806 A | * | 3/1997 | Blasko et al. ............ | 363/41 |
| 5,657,216 A | * | 8/1997 | Kaura ...................... | 363/41 |
| 5,706,186 A | * | 1/1998 | Blasko .................... | 363/41 |
| 6,023,417 A | * | 2/2000 | Hava et al. ............... | 363/41 |
| 6,534,949 B2 | * | 3/2003 | Szczesny et al. .......... | 318/801 |
| 7,307,401 B2 | | 12/2007 | Gataric et al. | |
| 2007/0133242 A1 | | 6/2007 | Welchko et al. | |

OTHER PUBLICATIONS

B.A. Welchko et al, "Method and Apparatus to Reduce PWM Voltage Distortion in Electric Drives," U.S. Appl. No. 11/676,574, filed Feb. 20, 2007.
M. Hava et al., "Simple Analytical and Graphical Methods for Carrier-Based PWM-VSI Drives," IEEE Trans. Power Electronics, vol. 14, No. 1, pp. 49-61, Jan. 1999.
Office Action Issued on Dec. 7, 2010, in Chinese Patent Application No. 200910002623.1.

\* cited by examiner

*Primary Examiner*—Walter Benson
*Assistant Examiner*—Thai Dinh
(74) *Attorney, Agent, or Firm*—Ingrassia Fisher & Lorenz, P.C.

(57) ABSTRACT

Methods and systems for controlling a power inverter in an electric drive system of an automobile are provided. A signal controlling the power inverter is modified utilizing a first voltage distortion compensation method if a modulation index of the signal is less than a first modulation index value. The signal is modified utilizing a second voltage distortion compensation method if the modulation index is at least equal to the first modulation index value.

14 Claims, 8 Drawing Sheets

METHOD AND SYSTEM FOR CONTROLLING A POWER INVERTER IN ELECTRIC DRIVES

TECHNICAL FIELD

The present invention generally relates to power inverters, and more particularly relates to methods and systems for controlling power inverters in electric drive systems.

BACKGROUND OF THE INVENTION

In recent years, advances in technology, as well as ever evolving tastes in style, have led to substantial changes in the design of automobiles. One of the changes involves the complexity of the electrical systems within automobiles, particularly alternative fuel vehicles, such as hybrid, electric, and fuel cell vehicles. Such alternative fuel vehicles typically use an electric motor, perhaps in combination with another actuator, to drive the wheels.

Discontinuous Pulse Width Modulation (DPWM) methods are often employed for controlling the switching action of three phase voltage source inverters which are used to control the phase currents of three-phase alternating current (AC) motors. A significant advantage of DPWM methods over continuous PWM methods, such as sinusoidal or space vector modulation, is reduced inverter switching losses, which helps to improve the efficiency of hybrid electric vehicles, particularly when only the electric motors are in use. DWPM methods differ from continuous PWM methods in that only one zero vector is used in a given switching cycle. As a result, each switch in a three phase inverter is typically not switched for 60° segments of an electrical cycle. The location of the 60° clamped segment with respect to the inverter output voltage and load power factor determines the type of DPWM method and resulting PWM properties.

Ideally, the switch pairs in each phase leg of the three-phase voltage source inverter each operate in a complimentary fashion such that one switch is always "on" and the other switch is always "off." In practice, however, a blanking time, or dead-time, is typically inserted during each transition of a switching state of the voltage source inverter. The dead-time is a short interval during which both switches are gated "off." This prevents both switches in a phase leg of the voltage source inverter from simultaneously being "on," which could short-circuit the voltage source inverter.

Additionally, the gate drive circuitry may have limitations or the switches may impose limitations on the minimum "on" time duration that is commanded (e.g., directed by a control module, processor, or the like) to a switch in the voltage source inverter. The minimum pulse width and dead-time limitations result in finite minimum (e.g., non-zero) and maximum (e.g., non-unity) values of duty cycle which can be commanded by the controller (e.g., a DPWM modulator).

These non-linear effects, dead-time and minimum pulse width, introduce distortion on ideal inverter output voltages as produced by DPWM control. Since DPWM control offers reduced losses compared to continuous PWM methods, it is desirable to employ DPWM control methods while simultaneously minimizing the distortion caused by the non-linear inverter effects. Minimizing distortion (which may increase torque ripple) is particularly important in hybrid vehicles which can be operated modes where the vehicle is driven via only electric power. Various compensation methods have recently been developed to reduce the distortion effects of inverter non-linearities on DPWM control. However, the various compensation methods have not been employed under a single, unitary control method.

Accordingly, it is desirable to provide a control method that employs the DPWM compensation method most suitable for the current system operating conditions. Furthermore, other desirable features and characteristics of the present invention will become apparent from the subsequent detailed description and the appended claims, taken in conjunction with the accompanying drawings and the foregoing technical field and background.

SUMMARY OF THE INVENTION

In one embodiment, a method for controlling a power inverter in an electric drive system of an automobile is provided. A signal controlling the power inverter is modified utilizing a first voltage distortion compensation method if a modulation index of the signal is less than a first modulation index value. The signal is modified utilizing a second voltage distortion compensation method if the modulation index is at least equal to the first modulation index value.

In another embodiment, a method for modifying a signal controlling a power inverter in an electric drive system of an automobile having a minimum pulse width and a maximum pulse width is provided. A first voltage distortion compensation method is utilized to modify the signal if a modulation index of the signal is less than a first modulation index value, and a second voltage distortion compensation method is utilized to modify the signal if the modulation index is at least equal to the first modulation index value.

In the first voltage distortion compensation method, the signal is received and a duty cycle of the signal has a range from a minimum achievable duty cycle to a maximum achievable duty cycle. A second signal is produced if the duty cycle of the signal is within an output voltage distortion range outside of the minimum and maximum pulse widths and less than a first clipping value. The second signal has the minimum achievable duty cycle. A third signal is produced if the duty cycle of the signal is within the output voltage distortion range and one of the duty cycle of the signal is at least equal to the first clipping value or the duty cycle of the signal is not greater than a second clipping value. The third signal has a closer one of the minimum and maximum pulse widths to the duty cycle of the signal, and the second clipping value is greater than the first clipping value. A fourth signal is produced if the duty cycle of the signal is within the output voltage distortion range and greater than the second clipping value. The fourth signal has the maximum achievable duty cycle. One of the second, third, and fourth signals is provided to the power inverter.

In the second voltage distortion compensation method, an output voltage vector of the power inverter is monitored. The power inverter has a switching cycle with a plurality of phase legs and a zero vector. The output voltage vector is based on the switching cycle of the power inverter. A modified switching cycle is produced by modifying a duty cycle of each of the plurality of phase legs by a duty cycle of the zero vector when the output voltage vector is in a distortion region. An output signal having the modified switching cycle is provided to the power inverter.

In a further embodiment, an automotive electric drive system is provided. The automotive electric drive system includes an electric motor, a power inverter coupled to the motor, and at least one processor coupled to the electric motor and the inverter. The at least one processor is configured to modify a signal controlling the power inverter utilizing a first voltage distortion compensation method if a modulation index of the signal is less than a first modulation index value and modify the signal utilizing a second voltage distortion compensation method if the modulation index is at least equal to the first modulation index value.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

The following description refers to elements or features being "connected" or "coupled" together. As used herein, unless expressly stated otherwise, "connected" means that one element/feature is directly joined to (or directly communicates with) another element/feature, and not necessarily mechanically. Likewise, unless expressly stated otherwise, "coupled" means that one element/feature is directly or indirectly joined to (or directly or indirectly communicates with) another element/feature, and not necessarily mechanically. However, it should be understood that although two elements may be described below, in one embodiment, as being "connected," in alternative embodiments similar elements may be "coupled," and vice versa. Thus, although the schematic diagrams shown herein depict example arrangements of elements, additional intervening elements, devices, features, or components may be present in an actual embodiment. It should also be understood that FIGS. 1-6 are merely illustrative and may not be drawn to scale.

FIG. 1 to FIG. 19 illustrate a method and a system for controlling a power inverter in an electric drive system of an automobile. A first voltage distortion compensation method is applied to a signal controlling the power inverter if a modulation index of the signal is less than a first modulation index value. A second voltage distortion compensation method is applied to the signal if the modulation index is greater than or equal to the first modulation index value.

Figure 1:
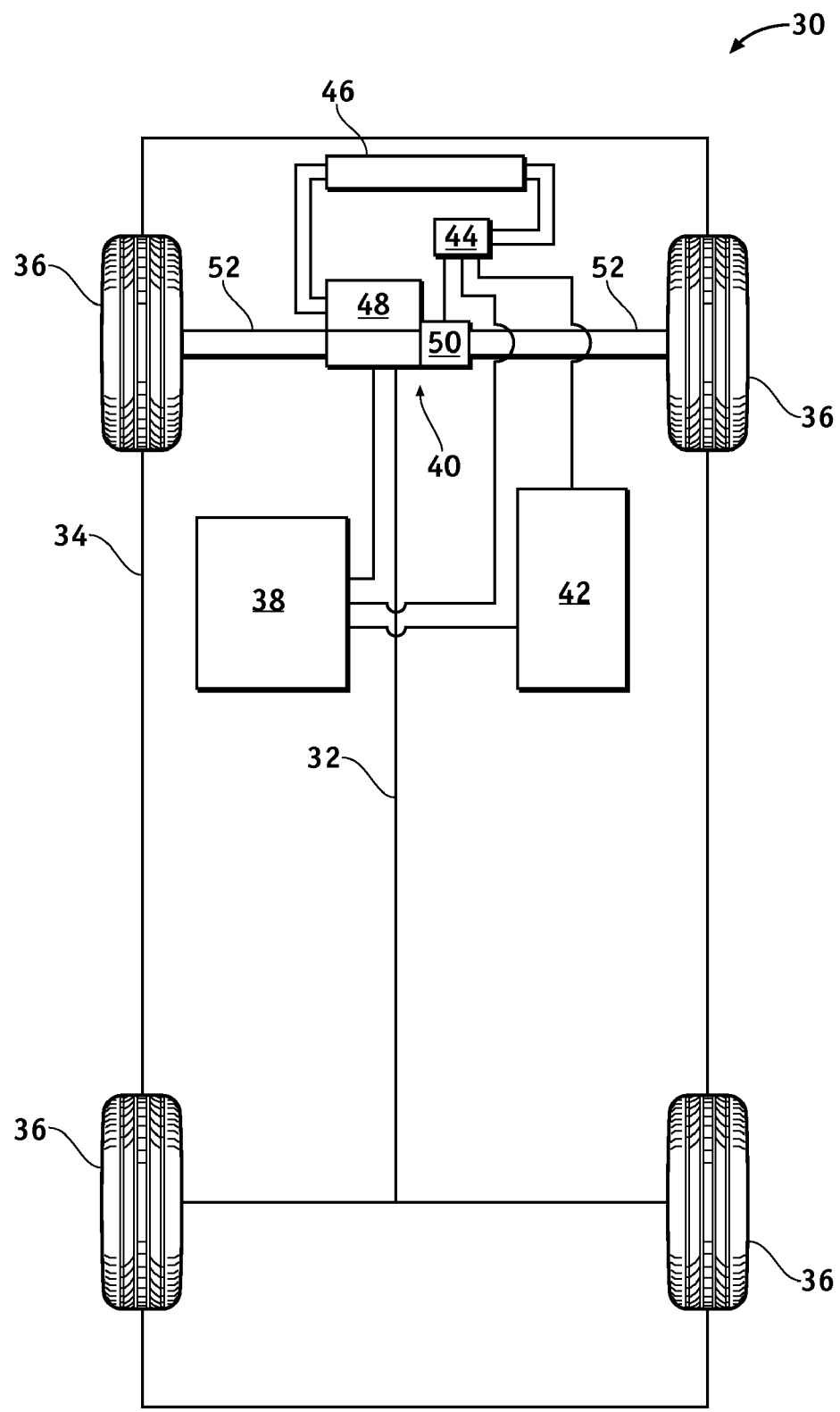
FIG. 1 is a schematic view of an exemplary automobile according to one embodiment of the present invention.

FIG. 1 illustrates a vehicle 30, or "automobile," according to one embodiment of the present invention. The automobile 30 includes a chassis 32, a body 34, four wheels 36, and an electronic control system 38. The body 34 is arranged on the chassis 32 and substantially encloses the other components of the automobile 30. The body 34 and the chassis 32 may jointly form a frame. The wheels 36 are each rotationally coupled to the chassis 32 near a respective corner of the body 34.

The automobile 30 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD). The vehicle 30 may also incorporate any one of, or combination of, a number of different types of engines (or actuators), such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine or fuel cell energy source, a combustion/electric motor hybrid engine, and an electric motor.

In the exemplary embodiment illustrated in FIG. 1, the automobile 30 is a hybrid vehicle, and further includes an actuator assembly 40, a battery (or other electrical energy storage) 42, a power inverter (or inverter) 44, and a radiator 46. The actuator assembly 40 includes a combustion engine 48 and an electric motor/generator (or motor) 50. The electric motor 50 is, in one embodiment, a sinusoidally-wound alternating current (AC) motor (e.g., permanent magnet or induction) such as commonly used in automotive vehicles (e.g., traction drive control systems, and the like). As will be appreciated by one skilled in the art, the electric motor 50 includes a transmission therein, and although not illustrated also includes a stator assembly (including conductive coils), a rotor assembly (including a ferromagnetic core), and a cooling fluid (i.e., coolant). The stator assembly and/or the rotor assembly within the electric motor 50 may include multiple (e.g., sixteen) electromagnetic poles, as is commonly understood.

Still referring to FIG. 1, in one embodiment, the combustion engine 48 and the electric motor 50 are integrated such that both are mechanically coupled to at least some of the wheels 36 through one or more drive shafts 52. The radiator 46 is connected to the frame at an outer portion thereof and although not illustrated in detail, includes multiple cooling channels therethough that contain a cooling fluid (i.e., coolant) such as water and/or ethylene glycol (i.e., "antifreeze") and is coupled to the engine 48 and the inverter 44. Referring again to FIG. 1, in the depicted embodiment, the inverter 44 receives and shares coolant with the electric motor 50. The radiator 46 may be similarly connected to the inverter 44 and/or the electric motor 50.

The electronic control system 38 is in operable communication with the actuator assembly 40, the battery 42, and the inverter 44. Although not shown in detail, the electronic control system 38 includes various sensors and automotive control modules, or electronic control units (ECUs), such as an inverter control module and a vehicle controller, and at least one processor and/or a memory which includes instructions stored thereon (or in another computer-readable medium) for carrying out the processes and methods as described below.

Figure 2:
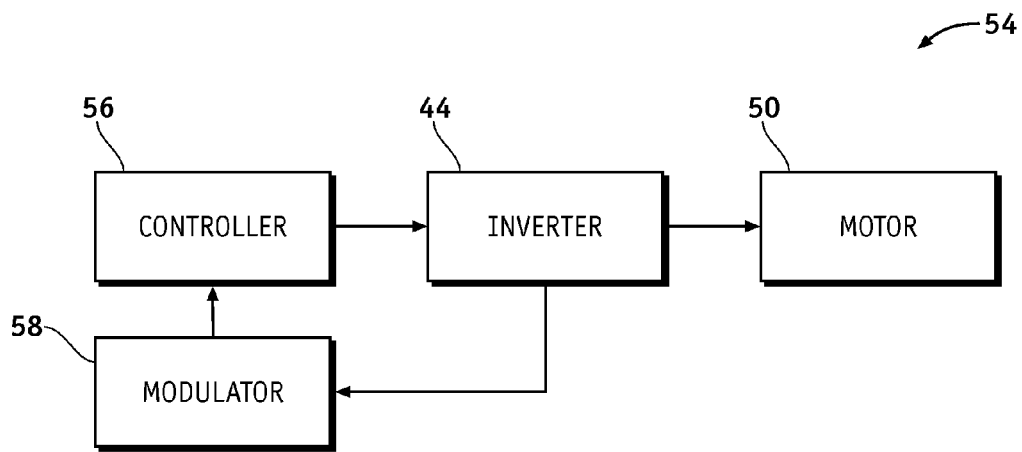
FIG. 2 is a block diagram of a voltage source inverter system within the automobile of FIG. 1.

Referring to FIG. 2, a voltage source inverter system (or electric drive system) 54 is shown in accordance with an exemplary embodiment of the present invention. The voltage source inverter system 54 includes a controller 56, the inverter 44 coupled to an output of the controller 56, the motor 50 coupled to a first output of the inverter 44, and a modulator 58 having an input coupled to a second output of the inverter 44 and having an output coupled to an input of the controller 56. The controller 56 and the modulator 58 may be integral with the electronic control system 38 shown in FIG. 1.

Figure 3:
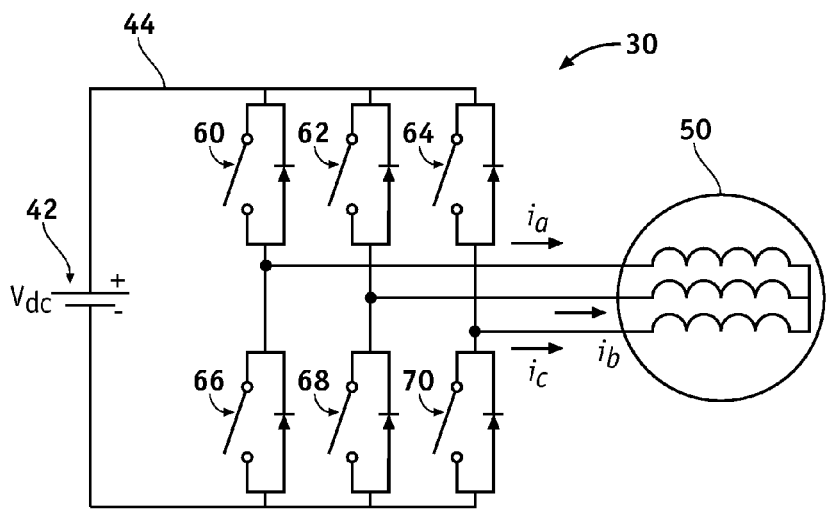
FIG. 3 is a schematic view of an inverter within the automobile of FIG. 1.

FIG. 3 illustrates the inverter 44 of FIGS. 1 and 2 in greater detail. The inverter 44 includes a three-phase circuit coupled to the motor 50. More specifically, the inverter 44 includes a switch network having a first input coupled to a voltage source $V_{dc}$ (e.g., the battery 42) and an output coupled to the motor 50. Although a single voltage source is shown, a distributed direct current (DC) link with two series sources may be used.

The switch network comprises three pairs of series switches with antiparallel diodes (i.e., antiparallel to each switch) corresponding to each of the phases. Each of the pairs of series switches comprises a first switch (or transistor) 60, 62, and 64 having a first terminal coupled to a positive electrode of the voltage source 42 and a second switch 66, 68, and 70 having a second terminal coupled to a negative electrode of the voltage source 42 and having a first terminal coupled to a second terminal of the respective first switch 60, 62, and 64. To monitor the switching cycle and output voltage vector of the inverter 44, the modulator 58 is coupled to the output of the inverter 44.

During operation, still referring to FIG. 1, the vehicle 30 is operated by providing power to the wheels 36 with the combustion engine 48 and the electric motor 50 in an alternating manner and/or with the combustion engine 48 and the electric motor 50 simultaneously. In order to power the electric motor 50, DC power is provided from the battery 42 to the inverter 44, which converts the DC power into AC power, before the power is sent to the electric motor 50. As will be appreciated by one skilled in the art, the conversion of DC power to AC power is substantially performed by operating (i.e., repeatedly switching) the transistors within the inverter 44 at a "switching frequency," such as, for example, 12 kilohertz (kHz).

Generally, the controller 56 produces a Pulse Width Modulation (PWM) signal for controlling the switching action of the inverter 44. In a preferred embodiment, the controller 56 preferably produces a discontinuous PWM (DPWM) signal having a single zero vector associated with each switching cycle of the inverter 44. The inverter 44 then converts the PWM signal to a modulated voltage waveform for operating the motor 50.

To optimize the operation of the motor 50, the modulator 58 monitors the modulated voltage waveform produced by the inverter 44 and determines when the switching of the inverter 44 is operating in a distortion region that is based on non-linear limitations (e.g., minimum pulse width and dead time) associated with the inverter 44. When the inverter 44 is operating in the distortion region, the modulator 58 instructs the controller 56 to transmit a modified DPWM signal that compensates for the distortion region (e.g., by varying a duty cycle for each phase leg of the switching cycle).

DPWM control methods introduce distortion in the applied output voltage due to the inverter non-linearity of dead-time and minimum pulse width limitations. According to one embodiment of the present invention, a method to apply various compensation methods on the DPWM control is provided, which allows for a minimized amount of distortion across the enter system operating range.

The minimum non-zero on duration of a particular DPWM control cycle may be defined as $t_{min}$ while the maximum non-continuous on duration of a particular DPWM control cycle may be defined as $t_{max}$. As will be appreciated by one skilled in the art, the physical time intervals defined by $t_{min}$ and $t_{max}$ may be determined from the hardware used (inverter switches and gate driver) in addition to the flexibility of the available hardware used to implement the desired DPWM method. For example, some hardware implementations of the controller may make the time intervals more or less restrictive, in some, or all cases. From the physical time intervals, non-clamped limits on duty cycle may be expressed as $$d_{min} = \frac{1}{t_s} t_{min} \qquad (1)$$

$$d_{max} = \frac{1}{t_s} t_{max} \qquad (2)$$

where $t_s$ represents the time interval of the DPWM control cycle. The inverse of the control cycle yields the inverter switching frequency or carrier frequency ($f_s$). Mathematically, the carrier frequency may be expressed as $$f_s = \frac{1}{t_s} \qquad (3)$$

Furthermore, it can be appreciated that a variable carrier frequency may be employed that is bounded such that $$f_{s\_min} \leq f_s \leq f_{s\_max} \qquad (4)$$

It should be noted that due to a changeable carrier frequency, the maximum and minimum non-clamped duty cycles which can be achieved at the particular operation point also change with the carrier frequency according to Equations 1-4 as expressed above.

The modulation index of the PWM signal defines the amplitude of the fundamental component of the output voltage. This is often defined in terms of the maximum fundamental output voltage which can be produced by the inverter in the six-step operation that is described below. The modulation index is then given as $$M_i = \frac{V_1^*}{\frac{2}{\pi} V_{dc}} \qquad (5)$$

where $V_1^*$ is the commanded amplitude of the fundamental component and $V_{dc}$ is the maximum output voltage of the battery 42.

In accordance with one embodiment of the present invention, a control method is provided which selects an optimum DPWM compensation method based on the operating conditions of the electric drive system. In particular, the selection of the appropriate compensation method may be based at least in part on the present modulation index within the electric drive system. In one embodiment, the control method selects between three compensation methods (i.e., a first, a second, and a third method).

The three compensation methods may be generalized as a "low modulation (LowMod) index compensation method," a "mid-modulation (MidMod) index compensation method," and a "high modulation (HighMod) index compensation method." As suggested by the generalized labels provided, the LowMod (or first) compensation method is employed during instances of relatively low modulation indices, the MidMod (or second) compensation method is employed during instances of a mid-range of modulation indices, and the High-Mod (or third) compensation method is employed during instances of relatively high modulation indices. Examples of these compensation methods are described in detail below.

Figure 4:
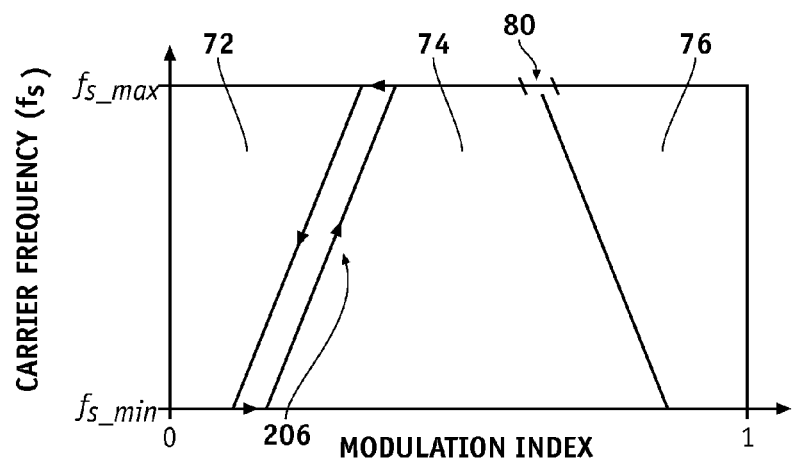
FIG. 4 is a graphical comparison of a modulation index and switching frequency of the voltage source inverter system shown in FIG. 2 illustrating a method for switching between first, second, and third compensation methods in accordance with one embodiment of the present invention.

FIG. 4 is graphical illustration of the use of each of the compensation methods in relation to the modulation index and carrier frequency ($f_s$) of the electric drive system according to the control method of one embodiment of the present invention. As shown, the graph includes a region for each of the compensation methods: a LowMod region 72, a MidMod region 74, and a HighMod region 76. As FIG. 4 illustrates, the LowMod compensation method is employed (i.e., utilized or applied) during periods in which the system is applying a low modulation index (i.e., within the LowMod region 72) to the motor. During periods of medium modulation indices (i.e., within the MidMod region 74), the method applies the MidMod compensation method. When near the boundary between the LowMod region 72 and the MidMod region 74, the method chooses the desired compensation method employing a hysteresis 78 (or other blending method) band between the two respective compensation methods.

In one embodiment, the lower boundary of the hysteresis band on the LowMod region 72 is determined approximately from $$M_{iLowMod\_max} = \frac{\pi}{\sqrt{3}} d_{min} \quad (6)$$

and the boundary between the MidMod region 74 and High-Mod region 76 is found approximately from $$M_{iMidMod\_max} = \frac{1}{\sqrt{3}} \frac{\pi}{2} d_{max} \quad (7)$$

The control method may utilize several possible methods to transition between the compensation regions 72, 74, and 76. In one preferred embodiment, the system applies the HighMod compensation method if the carrier frequency is at its maximum value ($f_{s\_max}$) and the controller 56 determines that the modulation index calculated by Equation 7 is in the HighMod region 76. If both conditions are satisfied, the controller 56 applies the HighMod compensation method with an additional hysteresis band 80 (or other blending method) such that the system re-enters the MidMod compensation method if the requested modulation index decreases. In the event that the controller 56 determines that the modulation index calculated by Equation 7 is in the HighMod region, but the switching frequency is not at its maximum value, the controller 56 applies the LowMod compensation method.

In a second preferred embodiment, the controller 56 applies the HighMod compensation method independent of the carrier frequency. The additional hysteresis band 80 is provided in such an embodiment as well, near the boundary between the MidMod region 74 and the HighMod region 76, with the upper boundary of the MidMod compensation hysteresis band provided by Equation 7.

In a third preferred embodiment, the controller 56 applies the LowMod compensation method at all modulation indexes whether or not an additional compensation method (i.e. Mid-Mod or HighMod compensation) is employed. In such an embodiment, it will be appreciated that the compensation limits (i.e. $d_{max}$ and $d_{min}$) are chosen to be less restrictive then those used to apply any additional compensation methods so that the LowMod compensation method does not interfere the operation of the other potential compensation methods.

As such, the signal is modified utilizing a first voltage distortion compensation method if a modulation index of the signal is less than a first modulation index value. The signal is modified utilizing a second voltage distortion compensation method if the modulation index is at least equal to (i.e., greater than or equal to) the first modulation index value.

In one embodiment, the signal is modified utilizing a third voltage distortion compensation method if the modulation index is at least equal to a second modulation index value, being greater than the first, and a switching frequency of the power inverter is at a maximum value. The signal is modified utilizing the first voltage distortion compensation method if the modulation index is at least equal to the second modulation index value and the switching frequency of the power inverter is not at the maximum value. In another embodiment, the signal is modified utilizing a third voltage distortion compensation method if the modulation index is at least equal to a second modulation index value that is greater than the first modulation index value.

LowMod Compensation Method

In the LowMod compensation method, in one embodiment, the effect of the distortions is reduced by maintaining an average output voltage in the distortion region. To maintain an average output voltage in the lower output voltage distortion range (e.g., between the minimum achievable duty cycle and the minimum pulse width), the duty cycle may be modified such that output voltage associated with the minimum pulse width is produced during one half of the lower output voltage distortion range. Similarly, to maintain an average output voltage in the upper output voltage distortion range (e.g., between the maximum pulse width and the maximum achievable duty cycle), the duty cycle may be modified such that output voltage associated with the maximum pulse width is produced during one half of the upper output voltage distortion range.

Upper and lower clipping values may be used to indicate when to modify the duty cycle and when the duty cycle is in the output voltage distortion range. For example, in one embodiment, the duty cycle is modified to the minimum achievable duty cycle (discrete zero) if the duty cycle is less than the lower clipping value. The duty cycle is modified to the minimum pulse width if the duty cycle is greater than or equal to the lower clipping value. The duty cycle is modified to the maximum pulse width if the duty cycle is greater than the maximum pulse width. The duty cycle is modified to the maximum achievable duty cycle if the duty cycle is greater than the upper clipping value.

In another embodiment, the lower and upper clipping values are selected as the mid-points of the respective distortion ranges (e.g., lower and upper output voltage distortion ranges) although the clipping values may be selected at any point between the respective distortion ranges. For example, the lower clipping value is selected as the mid-point between the minimum achievable duty cycle and the minimum pulse width, and the upper clipping value is selected as the mid-point between the maximum pulse width and the maximum achievable duty cycle. If the duty cycle is outside of the distortion range, the duty cycle is not modified to reduce distortion effects and is retained in the signal supplied to the inverter 44.

Figure 5:
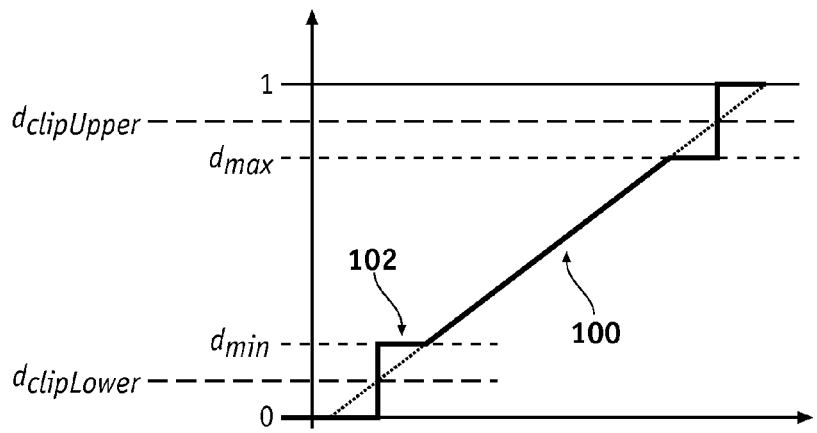
FIG. 5 is a waveform illustrating the relation between phase duty cycle and pulse width useful in understanding the voltage source inverter system of FIG. 2.

FIG. 5 is graphical illustration of the relationship between phase duty cycle and pulse width and is useful in understanding the voltage source inverter system 54 shown in FIG. 2, particularly with respect to the LowMod compensation method. An ideal duty cycle 100 and a duty cycle 102 modified in accordance with one embodiment of the LowMod compensation method are shown. The minimum and maximum pulse widths ($d_{min}$, $d_{max}$) delineate a boundary for the output voltage distortion range. For example, the output voltage distortion range is below the minimum pulse width ($d_{min}$) and above the maximum pulse width ($d_{max}$) and limited by the minimum achievable duty cycle (e.g., discrete zero) and the maximum achievable duty cycle (e.g., discrete one), respectively. In this embodiment, the lower clipping value ($d_{clipLower}$) is the mid-point between the minimum achievable duty cycle (discrete zero (0)) and the minimum pulse width ($d_{min}$), and the upper clipping value ($d_{clipUpper}$) is the mid-point between the maximum pulse width ($d_{max}$) and the maximum achievable duty cycle (discrete one (1)). The second clipping value (e.g., $d_{clipUpper}$) is greater than the first clipping value (e.g., $d_{clipLower}$). The minimum and maximum pulse widths are based on preventing a short-circuit of the switching circuit.

Figure 6:
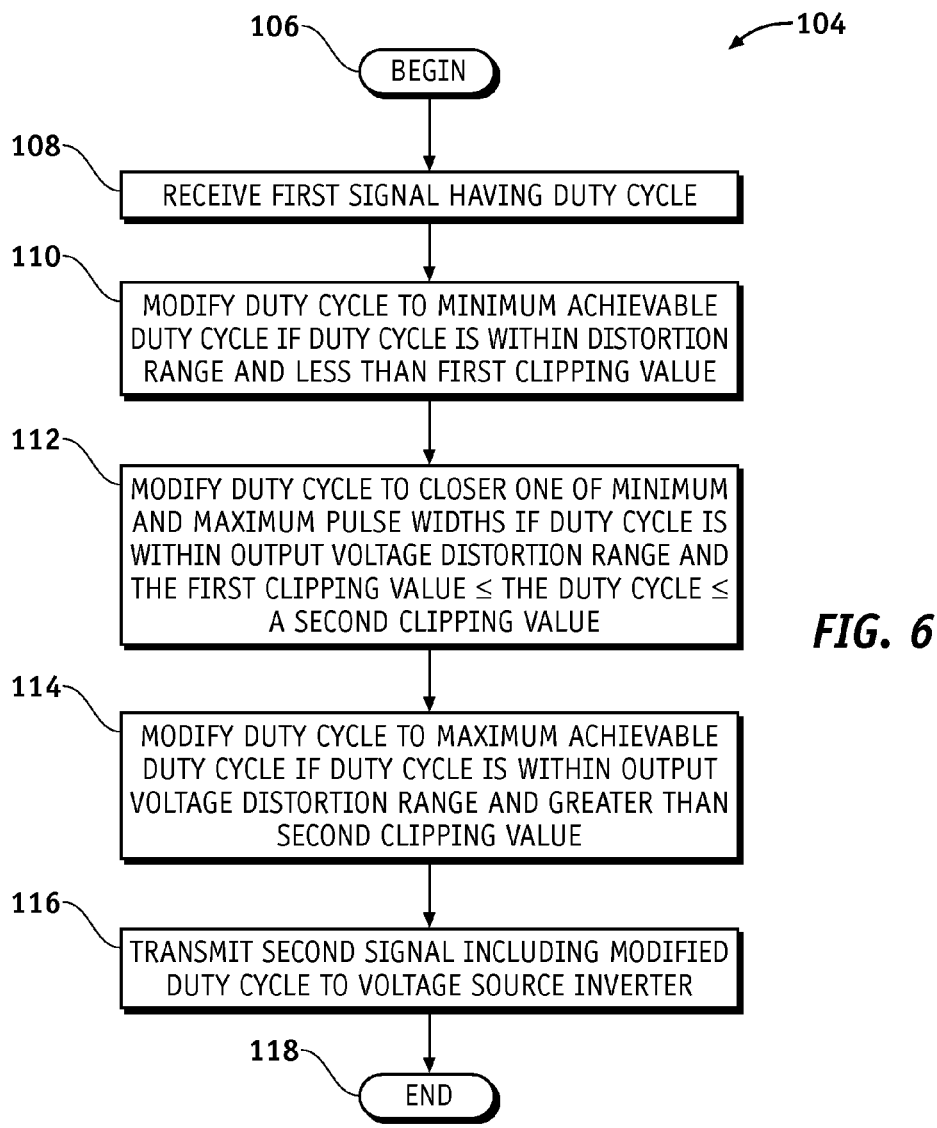
FIG. 6 is a flow diagram of the first compensation method in accordance with an exemplary embodiment of the present invention.

FIG. 6 is flow diagram of a method 104 for controlling a voltage source inverter in accordance with an exemplary embodiment of the LowMod compensation method. Referring to FIGS. 2 and 6, the inverter 44 has an output voltage distortion range. For example, in FIG. 6, the output voltage distortion range lies between the minimum achievable duty cycle (e.g., a discrete zero) and the minimum pulse width (e.g., $d_{min}$), as well as between the maximum pulse width (e.g., $d_{max}$) and a maximum achievable duty cycle (e.g., a discrete one). The method 104 begins at step 106, and a first signal having a duty cycle is received at step 108. For example, the modulator 58 receives a PWM signal from the controller 56. The duty cycle has a range from the minimum achievable duty cycle (e.g., a discrete zero) to the maximum achievable duty cycle (e.g., a discrete one).

The duty cycle is modified to the minimum achievable duty cycle (e.g., discrete zero) if the duty cycle is within the output voltage distortion range and less than a first clipping value (e.g., $d_{clipLower}$), as indicated at step 110. The duty cycle is modified to a closer one of the minimum and maximum pulse widths if the duty cycle is within the output voltage distortion range, the duty cycle is greater than or equal to the first clipping value, and the duty cycle is less than or equal to (or not greater than) a second clipping value, as indicated at step 112. In one embodiment, the duty cycle is modified to the minimum pulse width if the duty cycle is within the output voltage distortion range and greater than or equal to the first clipping value, and the duty cycle is modified to the maximum pulse width if the duty cycle is within the output voltage distortion range and less than or equal to the second clipping value. The first clipping value may be selected to be about a mid-point between the minimum achievable duty cycle and the minimum pulse width, and the second clipping value may be selected to be about a mid-point between the maximum achievable duty cycle and the maximum pulse width.

At step 114, the duty cycle is modified to the maximum achievable duty cycle if the duty cycle is within the output voltage distortion range and greater than the second clipping value. A second signal is transmitted (e.g., by the modulator 58) to the inverter 44, as indicated at step 116. The second signal comprises the duty cycle (e.g., modified or unmodified based on the preceding steps). For example, the duty cycle of the first signal is retained in the second signal if the duty cycle is outside of the output voltage distortion range. In one embodiment, the first and second signals are DPWM signals for controlling the switch network of the inverter 44. The method 104 ends at step 118.

The inverter 44 has a first average output voltage associated with the output voltage distortion range (e.g., between the minimum achievable duty cycle and the minimum pulse width). Additionally, the inverter 44 has a second average output voltage associated with the output voltage distortion range (e.g., between the maximum pulse width and the maximum achievable duty cycle). In this embodiment, the first average output voltage is maintained if the duty cycle is greater than or equal to the minimum achievable duty cycle and the duty cycle is less than the minimum pulse width. Additionally, the second average output voltage is maintained if the duty cycle is greater than the maximum pulse width and the duty cycle us less than or equal to the maximum achievable duty cycle.

Figure 7:
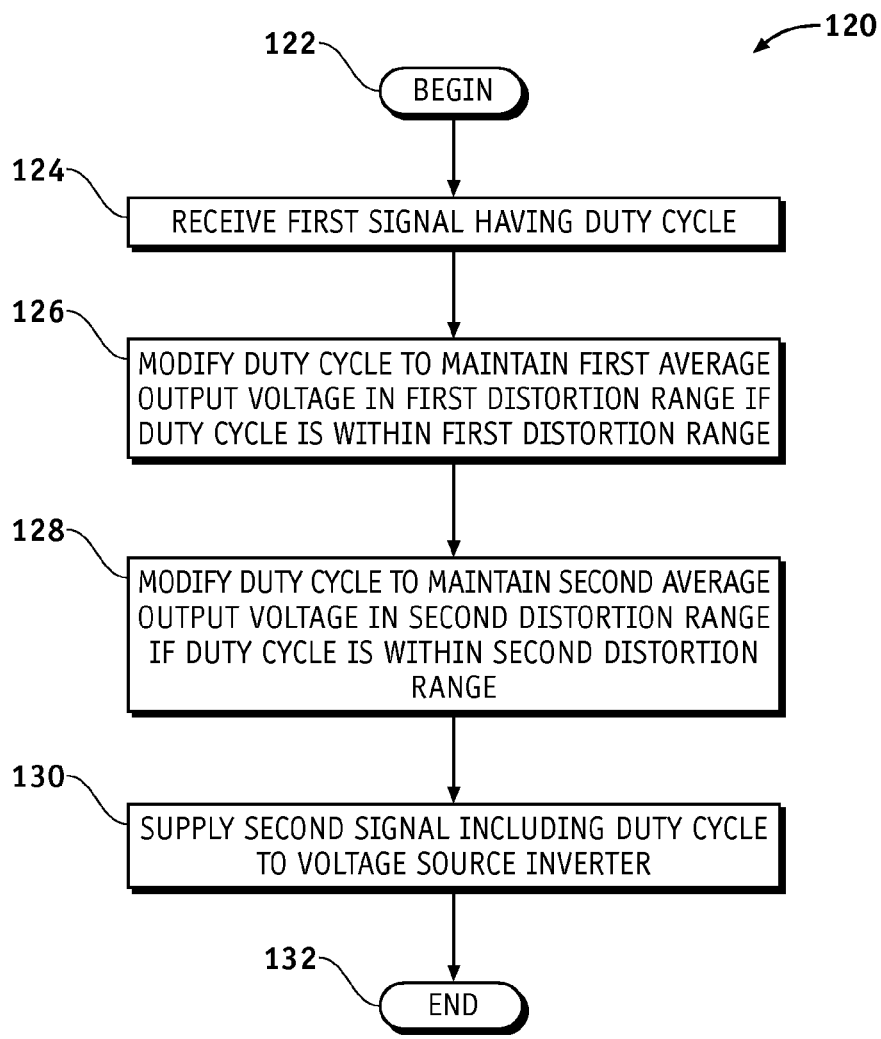
FIG. 7 is a flow diagram of the first compensation method in accordance with another exemplary embodiment of the present invention.

FIG. 7 is flow diagram of a method 120 for controlling a voltage source inverter in accordance with another exemplary embodiment of the LowMod compensation method. Referring to FIGS. 2 and 7, the method 120 begins at step 122, and a first signal is received (e.g., by the modulator 58) having a duty cycle at step 124. The duty cycle has a range from the minimum achievable duty cycle (e.g., discrete zero) to the maximum achievable duty cycle (e.g., discrete one). The duty cycle is modified to maintain a first average output voltage in the first distortion range if the duty cycle is within the first distortion range, as indicated at step 126. In one embodiment, the duty cycle is modified to the minimum achievable duty cycle if the duty cycle is within the first distortion range and less than a clipping value (e.g., $d_{clipLower}$) within the first distortion range, and the duty cycle is modified to the minimum duty cycle if the duty cycle is within the first distortion range and greater than or equal to the clipping value. The clipping value (e.g., $d_{clipLower}$) may be selected to be about a mid-point between the minimum achievable duty cycle and the minimum pulse width. In another embodiment, the duty cycle is modified to the minimum achievable duty cycle if the duty cycle is greater than or equal to the minimum achievable duty cycle and the duty cycle is less than the clipping value, and the duty cycle is modified to the minimum pulse width if the duty cycle is greater than or equal to the clipping value and the duty cycle is less than the minimum pulse width.

The duty cycle is modified to maintain a second average output voltage in the second distortion range if the duty cycle is within the second distortion range, as indicated at step 128. In one embodiment, the duty cycle is modified to the maximum pulse width if the duty cycle is within the second distortion range and less than or equal to a clipping value (e.g., $d_{clipUpper}$) within the second distortion range, and the duty cycle is modified to the maximum achievable duty cycle if the duty cycle is within the second distortion range and greater than the clipping value. In another embodiment, the duty cycle is modified to the maximum pulse width if the duty cycle is greater than the maximum pulse width and the duty cycle is less than the clipping value, and the duty cycle is modified to the maximum achievable duty cycle if the duty cycle is greater than the clipping value and the duty cycle is less than or equal to the maximum achievable duty cycle.

A second signal is supplied to the inverter 44, as indicated at step 130. The second signal includes the duty cycle. For example, the duty cycle of the first signal is retained in the second signal if the duty cycle is outside of the first distortion range and outside of the second distortion range (e.g., between $d_{min}$ and $d_{max}$).

MidMod Compensation Method

Figure 8:
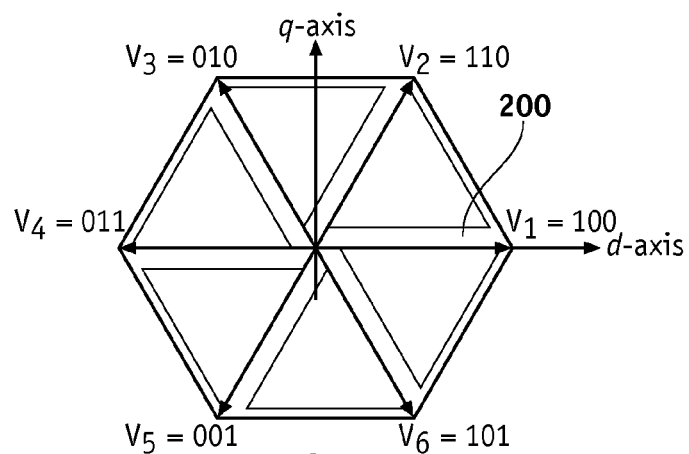
FIGS. 8-10 are graphs of inverter output voltage having distortion regions useful in further understanding the voltage source inverter system of FIG. 2.
Figure 9:
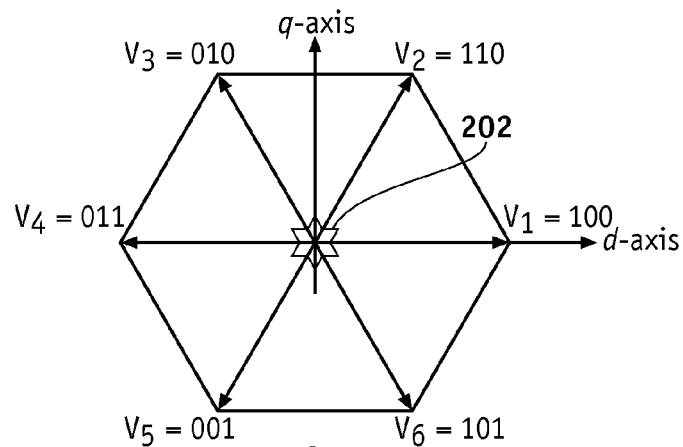
Figure 10:
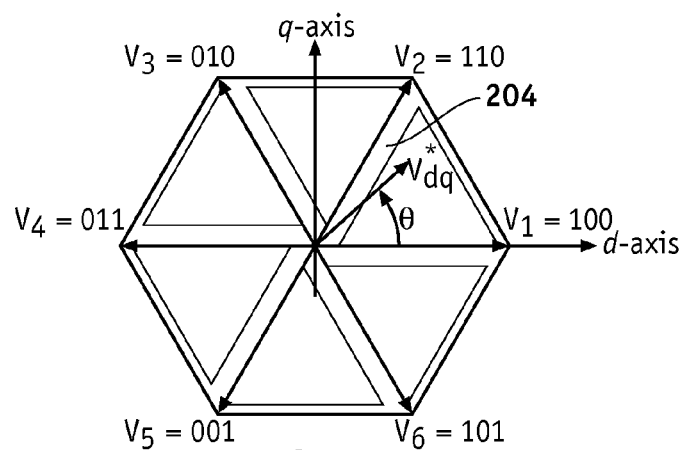

FIGS. 8-10 are graphs of inverter output voltages, having distortion regions, useful in understanding the voltage source inverter system 54 shown in FIG. 2, particularly with respect to the MidMod compensation method. The inverter output voltages are represented by vectors $V_1$, $V_2$, $V_3$, $V_4$, $V_5$, and $V_6$ corresponding to the switching for each phase (e.g., each of three phases) of the switching cycle. Each of the phases has two states (i.e., corresponding to discrete one and zero). For example, referring to FIGS. 3 and 8-10, $V_1$ is the voltage vector corresponding to a discrete one state of the first pair of switches 60 and 66 and a discrete zero state of each of the second and third pairs of switches 62 and 68 and 64 and 70. $V_2$ is the voltage vector corresponding to a discrete one state of each of the first and second pairs of switches 60 and 66 and 62 and 68 and a discrete zero state of the third pair of switches 64 and 70. $V_3$ is the voltage vector corresponding to a discrete zero state of each of the first and third pairs of switches 60 and 66 and 64 and 70 and a discrete one state of the second pair of switches 62 and 68. $V_4$ is the voltage vector corresponding to a discrete zero state of the first pair of switches 60 and 66 and a discrete one state of each of the second and third pairs of switches 62 and 68 and 64 and 70. $V_5$ is the voltage vector corresponding to a discrete zero state of each of the first and second pairs of switches 60 and 66 and 62 and 68 and a discrete one state of the third pair of switches 64 and 70. $V_6$ is the voltage vector corresponding to a discrete one state of each of the first and third pairs of switches 60 and 66 and 64 and 70 and a discrete zero state of the second pair of switches 62 and 68. A zero vector (e.g., at the center of the graphs) corresponds to either a discrete one state for each of the pairs of switches 60 and 66, 62 and 68, and 64 and 70 or a discrete zero state for each of the pairs of switches 60 and 66, 62 and 68, and 64 and 70.

A distortion region 200 associated with the thirty degree (30°) leading power factor load of DPWM0 is shown in FIG. 8, a distortion region 202 associated with the unity power factor load of DPWM1 is shown in FIG. 9, and a distortion region 204 associated with the thirty degree (30°) lagging power factor load associated with DPWM2 is shown in FIG. 10. Under all operating conditions, the switching network is subject to minimum pulse width limits and dead time limitations which are non-linear limitations represented by the distortion regions. Because the inverter limitations of minimum pulse width and dead time are fixed time values, the angular width (θ) or span of the distortion region, as shown in FIG. 11, varies with the modulation depth of the output voltage and the switching frequency of the switching network.

The switches 60-70 may be activated (e.g., closed) based on a modified generalized DPWM (GDPWM) method such that the clamped segment is adjusted depending upon the power factor or other condition. In general, the GDPWM method is preferable for hybrid vehicle applications because inverter losses can be decreased over continuous PWM methods. Due to the ease of modulating the zero vector, GDPWM can be configured for any operating condition. However, with GDPWM, the distortion regions are rotated by angular offset from the sector transitions, and thus the distortion regions for GDPWM continuously change. By proper control of the output pulses of the DPWM signal from the controller 56 as modified by the modulator 58, the effects of these non-linearities (represented by the distortion regions) are compensated. With GDPWM, the modulator 58 selects an appropriate zero vector based upon the maximum phase current whose angle varies with load power factor.

Figure 11:
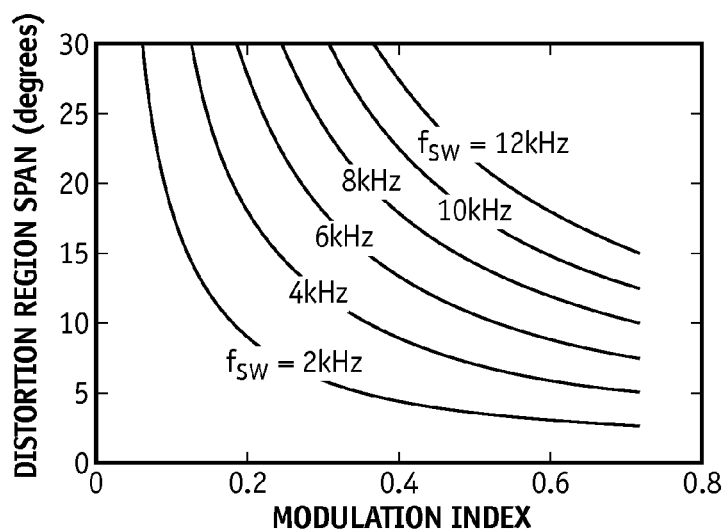
FIG. 11 is a graph of multiple distortion spans useful in further understanding the voltage source inverter system of FIG. 2.

FIG. 11 is a graph of multiple distortion spans useful in further understanding the voltage source inverter system 54 shown in FIG. 2. The distortion spans vary based on the switching frequency (e.g., 2 kHz, 4 kHz, 6 kHz, 8 kHz, 10 kHz, and 12 kHz) and a modulation index. Because the distortion span varies with switching frequency, switching the zero vector depending solely upon the spatial location of the commanded voltage vector (e.g., in the space vector diagrams shown in FIGS. 8-10) may not be practical because the distortion regions continuously change when using GDPWM. The modified GDPWM method selects the zero vector when the output voltage vector is in a distortion region by operating on the phase duty cycle commands directly.

Figure 12:
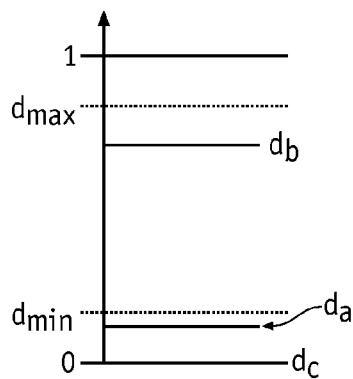
FIGS. 12-15 are phase duty cycles useful in further understanding the voltage source inverter system shown in FIG. 2.
Figure 13:
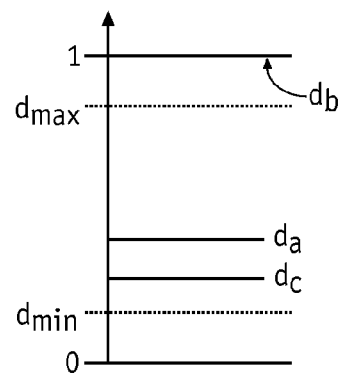

FIGS. 12-15 are phase duty cycles useful in further understanding the voltage source inverter system 54 shown in FIG. 2. FIG. 12 shows the phase duty cycles ($d_a$, $d_b$, and $d_c$) for a switching cycle. Phase duty cycle $d_a$ is in a distortion region between the minimum duty cycle ($d_{min}$) and discrete zero while phase duty cycle $d_c$ is at discrete zero. Phase duty cycle $d_b$ is between $d_{min}$ and the maximum duty cycle ($d_{max}$). FIG. 13 shows the phase duty cycles ($d_a$, $d_b$, and $d_c$) after the duty cycle of the zero vector is added to the duty cycles of each of the phase legs of the switching cycle shown in FIG. 12. In FIG. 13, phase duty cycles $d_a$ and $d_c$ are now between $d_{min}$ and $d_{max}$ and $d_b$ is now at discrete one. By adding the duty cycle of the zero vector to the duty cycles of each phase leg in the switching cycle when the output voltage vector is in the distortion region between $d_{min}$ and discrete zero, this distortion region is compensated by the voltage source inverter system 54.

Figure 14:
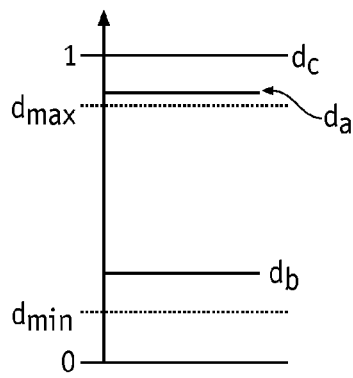
Figure 15:
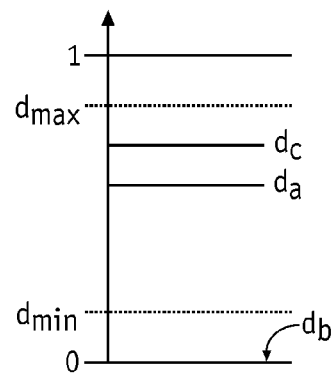

FIG. 14 shows the phase duty cycles ($d_a$, $d_b$, and $d_c$) for another switching cycle. Phase duty cycle $d_a$ is in a distortion region between $d_{max}$ and discrete one, phase duty cycle $d_c$ is at discrete one, and phase duty cycle $d_b$ is between $d_{min}$ and $d_{max}$. FIG. 15 shows the phase duty cycles ($d_a$, $d_b$, and $d_c$) after the duty cycle of the zero vector is subtracted from the duty cycles of each of the phase legs of the switching cycle shown in FIG. 14. In FIG. 15, phase duty cycles $d_a$ and $d_c$ are now between $d_{min}$ and $d_{max}$, and phase duty cycle $d_b$ is now at discrete zero. By subtracting the duty cycle of the zero vector from the duty cycles of each phase leg in the switching cycle when the output voltage vector is in the distortion region between $d_{min}$ and discrete zero, this distortion region is compensated by the voltage source inverter system 54.

Referring back to FIG. 2, in an exemplary embodiment, the modulator 58 transmits a control signal or modulation signal to the controller 56 when the output voltage vector is in the distortion region. This control signal or modulation signal changes the DPWM signal by changing duty cycle of each of the phase legs in the switching cycle by a duty cycle of the zero vector. For example, when a phase leg of the switching cycle is less than $d_{min}$ (and not discrete zero), the modulator 58 adds the duty cycle of the zero vector to each of the phase legs in the switching cycle. When a phase leg of the switching cycle is greater than $d_{max}$ (and not discrete one), the modulator 58 subtracts the duty cycle of the zero vector from each of the phase legs in the switching cycle. The controller 56 transmits the modified DPWM signal to the inverter 44.

Figure 16:
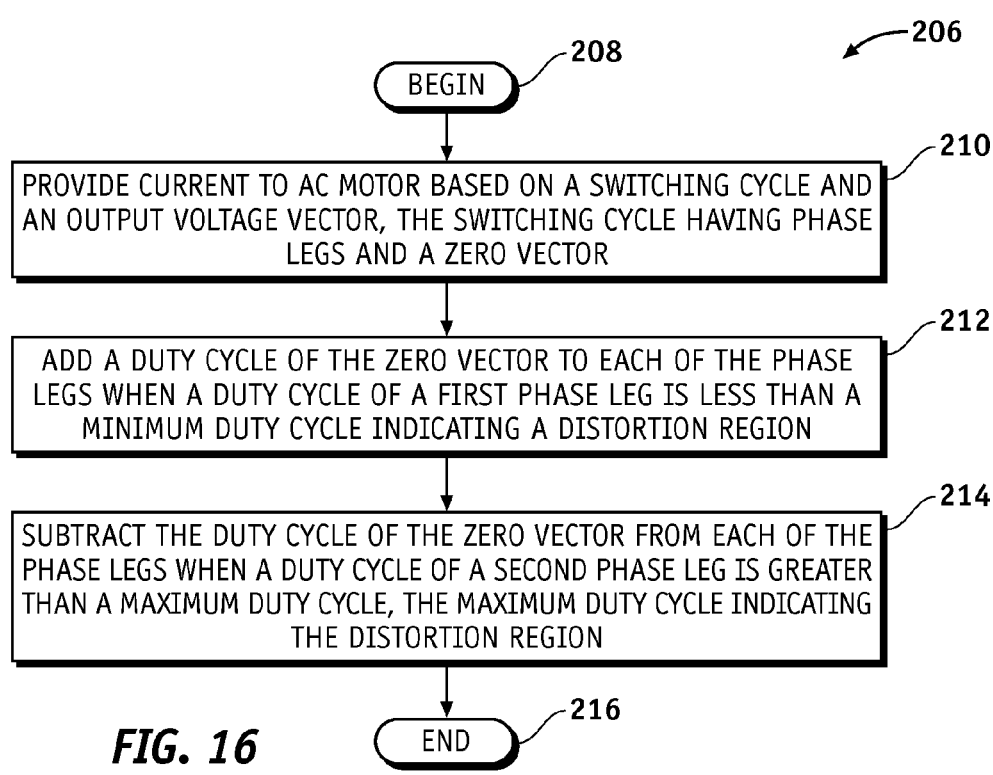
FIG. 16 is a flow diagram of the second compensation method in accordance with an exemplary embodiment of the present invention.

FIG. 16 is flow diagram of a method 206 for controlling a voltage source inverter in accordance with an exemplary embodiment of the MidMod compensation method. The method begins at step 208. A voltage is provided to the motor 50 based on a switching cycle and an output voltage vector at step 210. The switching cycle has a plurality of phase legs and has a zero vector. A duty cycle of each of the plurality of phase legs is modified by a duty cycle of the zero vector when the output voltage vector is in a distortion region. At step 212, when a duty cycle of a first phase leg of the switching cycle is less than a minimum duty cycle, which indicates the distortion region, a duty cycle of the zero vector is added to each of the plurality of phase legs. At step 214, when a duty cycle of a second phase leg is greater than a maximum duty cycle, which indicates the distortion region, the duty cycle of the zero vector is subtracted from each of the plurality of phase legs. The method 206 ends at step 216.

HighMod Compensation Method

Figure 17:
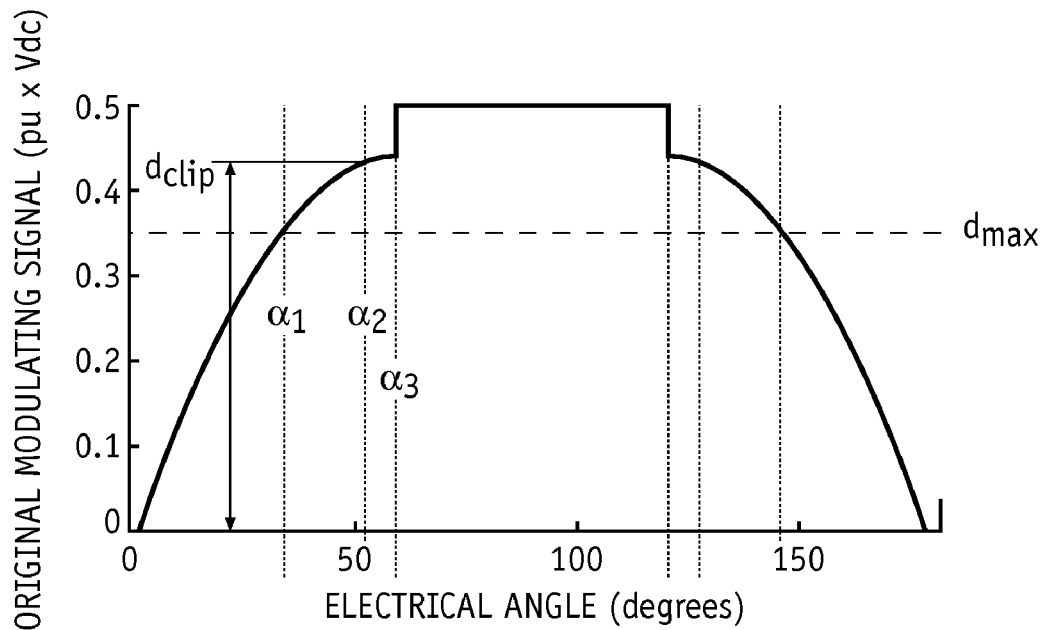
FIG. 17 is an input modulation waveform useful in further understanding the voltage source inverter system of FIG. 2.

FIG. 17 is an input modulation waveform useful in explaining the operation of the voltage source inverter system 54 shown in FIG. 2, particularly with respect to the HighMod compensation method. For simplicity of explanation, the input modulation waveform is shown and described with respect to the duty cycles associated with the positive half wave of an input modulation signal (e.g., a PWM signal) provided to the inverter 44. The input modulation waveform also includes a substantially symmetrical negative half wave for each fundamental cycle of the input modulation signal. Additionally, the positive half wave of the input modulation signal corresponds to a single phase leg of the inverter 44. Once the modulation index ($M_i$) increases beyond a value where a commanded duty cycle (d) is greater than a maximum duty cycle limit ($d_{max}$) or less than a minimum duty cycle limit ($d_{min}$), the input-output voltage relationship of the voltage source inverter may become non-linear.

Figure 18:
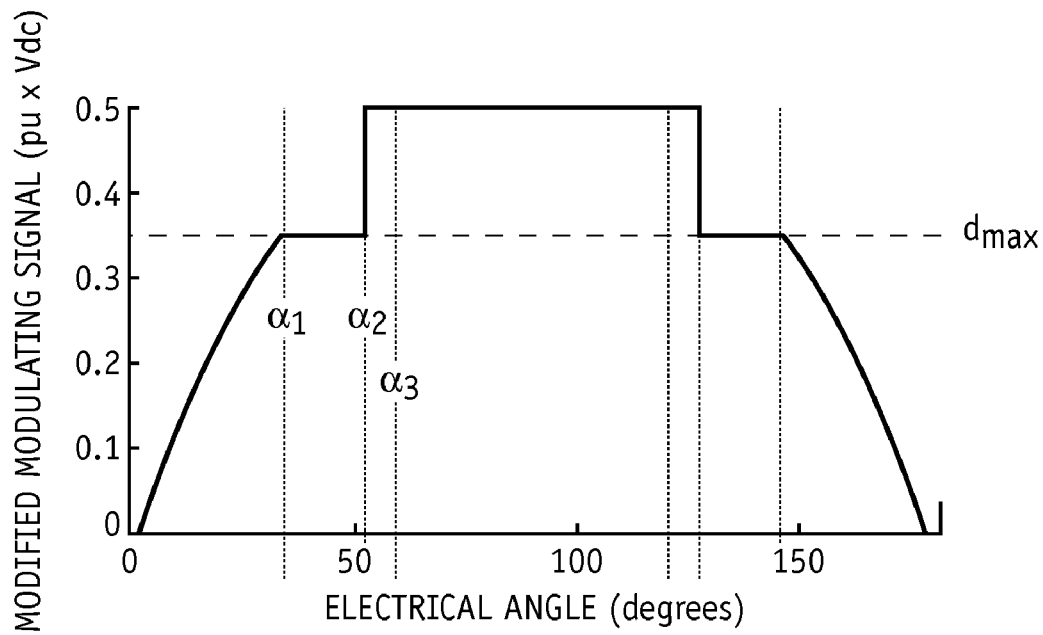
FIG. 18 is an input modulation waveform useful in further understanding the voltage source inverter system of FIG. 2.

FIG. 18 is an output modulation waveform useful in further explaining the operation of the voltage source inverter system 54 shown in FIG. 2. For simplicity of explanation, the output modulation waveform is shown and described with respect to the duty cycles associated with the positive half wave of a modified modulation signal (e.g., a modified PWM signal) provided to the voltage source inverter. To substantially preserve the input-output voltage linearity of the fundamental component of the voltage source inverter, the input modulation waveform shown in FIG. 17 is limited to the maximum duty cycle limit ($d_{max}$) between first and second phase angles (e.g., $\alpha_1$ and $\alpha_2$) of the first positive half of the input modulation waveform (e.g., between about 0° and about 90°). Once the electrical phase angle of the input modulation waveform has reached the second phase angle ($\alpha_2$), the duty cycle is limited to a reference potential, such as an upper voltage rail. For a second positive half (e.g., between about 90° and about 180°), the input modulation waveform shown in FIG. 17 is similarly limited to $d_{max}$ at first and second phase angles of the second positive half that are symmetrical about 90° to the first and second phase angles ($\alpha_1$, $\alpha_2$) of the first half of the positive half of the input modulation waveform. The result of this process is the output modulation waveform shown in FIG. 18. Additionally, this process of limiting the duty cycle in the first and second halves of the positive half wave of the input modulation signal is repeated for the first and second halves of the negative half wave of the input modulation signal.

A minimum modulation index ($M_{i\_min}$) at which this compensation occurs (e.g., modification of the duty cycles of the input modulation waveform) is preferably derived from:

$$M_{i\_min} = \frac{d_{max} + 0.5}{\sqrt{3}\ k}, \tag{8}$$

where $d_{max}$ is referenced to ±0.5, as shown in FIGS. 17 and 18, and the factor k is given as:

$$k=2V_{dc}/p \tag{9}$$

An over-modulation range corresponding to a maximum modulation index ($M_{i\_max}$) occurs at:

$$M_{i\_max}=p/2\sqrt{3}\approx 0.907 \tag{10}$$

The minimum modulation index ($M_{i\_min}$) and the maximum modulation index ($M_{i\_max}$) establish a compensation range (e.g., $M_{i\_min}<M_i<M_{i\_max}$) for possible distortion to the input-output voltage relationship of the voltage source inverter.

When the modulation index ($M_i$) is in the distortion range (e.g., $M_{i\_min}<M_i<M_{i\_max}$), the first phase angle ($\alpha_1$) is a function of both the modulation index ($M_i$) and the maximum pulse width and is found by solving $$d_{max}=M_ik\sin(\alpha_1)-\tfrac{1}{2}-M_ik\sin(\alpha_1-2\pi/\sqrt{3}) \tag{11}$$

Once the first phase angle ($\alpha_1$) is known, the second phase angle ($\alpha_2$), which is also a function of both the modulation index ($M_i$) and the maximum pulse width, is found by solving $$M_ik=1/\pi^2[2\ M_ik\pi\alpha_1+2M_i\alpha_1+\sqrt{3}M_i-2\pi]+1/\pi^2[2\pi\cos(\alpha_1)-M_ik\pi\sin(2\alpha_1)-2\ M_i\sin(2\alpha_1+\pi/3)]+4/\pi d_{max}[\cos(\alpha_1)-\cos(\alpha_2)]+\pi\cos(\alpha_2) \tag{12}$$

The value of $d_{clip}$ varies with the first and second phase angles ($\alpha_1$, $\alpha_2$) that in turn vary with the commanded modulation index ($M_i$) and the maximum pulse width. In an exemplary embodiment, the value of $d_{clip}$ may be pre-determined and stored (e.g., in a look-up table) for access by the controller 56 (FIG. 2) to determine duty cycles normally provided to the inverter 44 (FIG. 1). Using this pre-determined value of $d_{clip}$ for the commanded modulation index ($M_i$), the actual pulses transmitted to the switch network may be modified by the controller 56.

When the commanded modulation index ($M_i$) is greater than the maximum modulation index ($M_{i\_max}$), the value of $d_{clip}$ can be approximated as $$d_{clip}=\tfrac{1}{2}-\tfrac{1}{2}(\tfrac{1}{2}-d_{max}). \tag{13}$$

Figure 19:
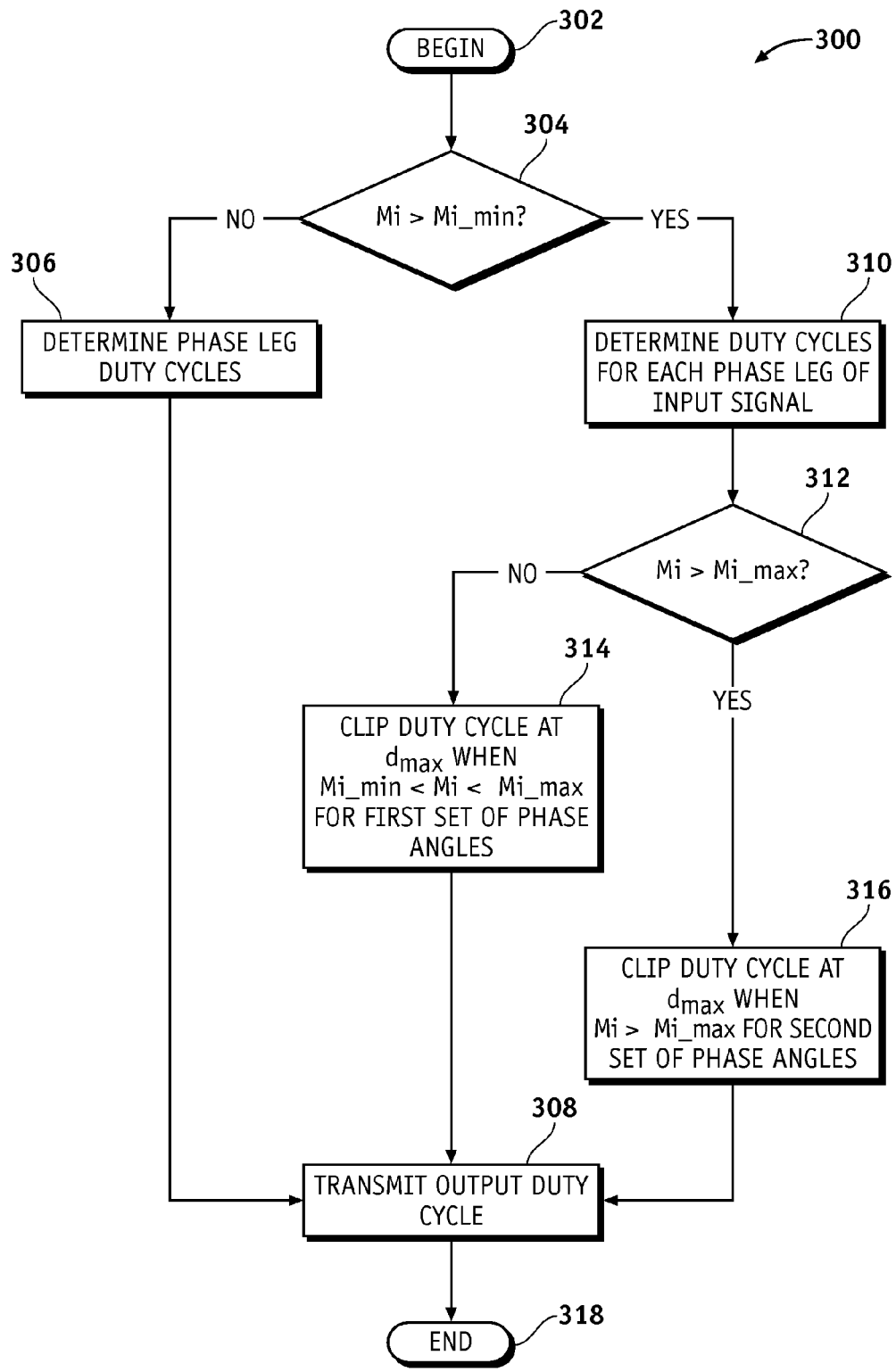
FIG. 19 is a flow diagram of the third compensation method in accordance with an exemplary embodiment of the present invention.

Referring to FIGS. 2 and 19, a method 300 of controlling a modulation signal for the inverter 44 is shown in accordance with an exemplary embodiment of the HighMod compensation method. The method 300 begins at step 302, and the controller 56 determines whether the commanded modulation index ($M_i$) is greater than the minimum modulation index ($M_{i\_min}$) at step 304. As previously mentioned, the minimum modulation index ($M_{i\_min}$) indicates a distortion range corresponding to the maximum duty cycle limit ($d_{max}$). In the event that the commanded modulation index ($M_i$) is less than the minimum modulation index ($M_{i\_min}$), the controller 56 determines the duty cycles for each phase leg of input modulation signal at step 306. For example, for a three-phase voltage source inverter, the controller 56 determines the duty cycles of the phase legs for each of the three phases. After the duty cycles are determined at step 306, the controller 56 transmits an output duty cycle to the inverter 44 at step 308.

In the event that the commanded modulation index ($M_i$) is greater than the minimum modulation index ($M_{i\_min}$), the controller 56 determines the duty cycles for each phase leg of the input modulation signal at step 310. After the duty cycles are determined at step 310, the controller 56 determines whether the commanded modulation index ($M_i$) is greater than the maximum modulation index ($M_{i\_max}$) at step 312. In the event that the commanded modulation index ($M_i$) is less than the maximum modulation index ($M_{i\_max}$), the controller 56 limits the duty cycle to the maximum duty cycle limit $d_{max}$ with a first set of phase angles ($\alpha_1$, $\alpha_2$) when the $M_{i\_min} < M_i < M_{i\_max}$ at step 314.

In an exemplary embodiment, the controller 56 clamps the input modulation signal at a first potential when the duty cycle reaches the first phase angle ($\alpha_1$), indicating the maximum duty cycle limit ($d_{max}$), and clamps the signal at a second potential when the duty cycle reaches a second phase angle ($\alpha_2$).

From Equations 9 and 10 above, in an exemplary embodiment, the over-modulation range corresponding to the maximum modulation index ($M_{i\_max}$) occurs at:

$$M_{i\_max} = p/2\sqrt{3} \approx 0.907$$

The controller 56 limits the duty cycle to the maximum duty cycle limit $d_{max}$ with a second set of phase angles ($\alpha_1$, $\alpha_2$), different from the first set of phase angles, when $M_i > M_{i\_max}$ at step 316. For example, the controller 56 clamps the input modulation signal at a first potential when the duty cycle reaches the first phase angle ($\alpha_1$), indicating the maximum duty cycle limit ($d_{max}$), and clamps the signal at a second potential when the duty cycle reaches a second phase angle ($\alpha_2$) when $M_i > M_{i\_max}$.

In an exemplary embodiment, the second duty cycle limit ($d_{clip}$) is determined by:

$$d_{clip} = \tfrac{1}{2} - \tfrac{1}{2}(\tfrac{1}{2} - d_{max}) \qquad (14)$$

After the duty cycle is limited at the second duty cycle limit at step 316, the controller 56 transmits the output duty cycle as associated with the modified signal at step 314. The method ends at step 318.

Although the exemplary embodiment of the method is shown and described with reference to a DPWM signal method, one that is switching loss optimized for a unity power factor load (e.g., DPWM1), the equations representing the various duty cycles may be modified for other DPWM signal methods.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof

What is claimed is:

1. A method for controlling a power inverter in an electric drive system of an automobile comprising:
    modifying a signal controlling the power inverter utilizing a first voltage distortion compensation method if a modulation index of the signal is less than a first modulation index value;
    modifying the signal utilizing a second voltage distortion compensation method if the modulation index is at least equal to the first modulation index value;
    modifying the signal utilizing a third voltage distortion compensation method if the modulation index is at least equal to a second modulation index value and a switching frequency of the power inverter is at a maximum value, wherein the second modulation index value is greater than the first modulation index value; and
    modifying the signal utilizing the first voltage distortion compensation method if the modulation index is at least equal to the second modulation index value and the switching frequency of the power inverter is not at the maximum value.

2. The method of claim 1, wherein the first modulation index value is based at least in part on a minimum non-zero duration of a control cycle of the electric drive system and the second modulation index value is based at least in part on a maximum non-continuous duration of the control cycle of the electric drive system.

3. The method of claim 2, wherein the first and second modulation index values are based at least in part on the switching frequency of the power inverter.

4. The method of claim 3, wherein the electric drive system has a minimum pulse width based at least in part on the minimum non-zero duration of the control cycle of the electric drive system and the switching frequency of the power inverter, a maximum pulse width based at least in part on the maximum non-continuous duration of the control cycle of the electric drive and the switching frequency of the power inverter, and an output voltage distortion range outside of the minimum and maximum pulse widths.

5. The method of claim 4, wherein the signal is a first signal having a duty cycle and the first voltage distortion compensation method comprises:
    receiving the first signal, the duty cycle of the first signal having a range from a minimum achievable duty cycle to a maximum achievable duty cycle;
    producing a second signal if the duty cycle of the first signal is within the output voltage distortion range and less than a first clipping value, the second signal having the minimum achievable duty cycle;
    producing a third signal if the duty cycle of the first signal is within the output voltage distortion range and one of the duty cycle of the first signal is at least equal to the first clipping value or the duty cycle of the first signal is not greater than a second clipping value, the third signal having a closer one of the minimum and maximum pulse widths to the duty cycle of the first signal, the second clipping value being greater than the first clipping value;
    producing a fourth signal if the duty cycle of the first signal is within the output voltage distortion range and greater than the second clipping value, the fourth signal having the maximum achievable duty cycle; and
    transmitting one of the second, third, and fourth signals to the power inverter.

6. The method of claim 5, wherein the power inverter has a switching cycle with a plurality of phase legs and a zero vector and the second voltage distortion compensation method comprises:

monitoring an output voltage vector of the power inverter, the output voltage vector being based on the switching cycle of the power inverter;
producing a modified switching cycle by modifying a duty cycle of each of the plurality of phase legs by a duty cycle of the zero vector when the output voltage vector is in a distortion region; and
providing a signal to the power inverter, the signal having the modified switching cycle.

7. The method of claim 6, wherein the third voltage distortion compensation method comprises:
determining a duty cycle limit based on the first signal;
limiting the first signal to the duty cycle limit when the modulation index is greater than a minimum modulation index value to produce an output signal; and
transmitting the output signal to the power inverter.

8. A method for modifying a signal controlling a power inverter in an electric drive system, having a minimum pulse width and a maximum pulse width, of an automobile, the method comprising:
utilizing a first voltage distortion compensation method to modify the signal if a modulation index of the signal is less than a first modulation index value, the first voltage distortion compensation method comprising:
receiving the signal, a duty cycle of the signal having a range from a minimum achievable duty cycle to a maximum achievable duty cycle;
producing a second signal if the duty cycle of the signal is within an output voltage distortion range outside of the minimum and maximum pulse widths and less than a first clipping value, the second signal having the minimum achievable duty cycle;
producing a third signal if the duty cycle of the signal is within the output voltage distortion range and one of the duty cycle of the signal is at least equal to the first clipping value or the duty cycle of the signal is not greater than a second clipping value, the third signal having a closer one of the minimum and maximum pulse widths to the duty cycle of the signal, the second clipping value being greater than the first clipping value;
producing a fourth signal if the duty cycle of the signal is within the output voltage distortion range and greater than the second clipping value, the fourth signal having the maximum achievable duty cycle; and
transmitting one of the second, third, and fourth signals to the power inverter; and
utilizing a second voltage distortion compensation method to modify the signal if the modulation index is at least equal to the first modulation index value, the second voltage distortion compensation method comprising:
monitoring an output voltage vector of the power inverter, the power inverter having a switching cycle with a plurality of phase legs and a zero vector, the output voltage vector being based on the switching cycle of the power inverter;
producing a modified switching cycle by modifying a duty cycle of each of the plurality of phase legs by a duty cycle of the zero vector when the output voltage vector is in a distortion region; and
providing an output signal to the power inverter, the output signal having the modified switching cycle.

9. The method of claim 8, further comprising:
utilizing a third voltage distortion compensation method to modify the signal if the modulation index is at least equal to a second modulation index value, the second modulation index value being greater than the first modulation index value and a switching frequency of the power inverter is at a maximum value; and
utilizing the first voltage distortion compensation method to modify the signal if the modulation index is at least equal to the second modulation index value and the switching frequency of the power inverter is not at the maximum value.

10. The method of claim 9, wherein the third voltage distortion compensation method comprises:
determining a duty cycle limit based on the signal;
limiting the signal to the duty cycle limit when the modulation index is greater than a minimum modulation index value to produce an output signal; and
transmitting the output signal to the power inverter.

11. The method of claim 10, further comprising utilizing the first voltage distortion compensation method to modify the signal if the modulation index is at least equal to the first modulation index value.

12. The method of claim 11, wherein the first, second, third, fourth, and output signals are discontinuous pulse width modulation (DPWM) signals.

13. An automotive electric drive system comprising:
an electric motor;
a power inverter coupled to the motor; and
at least one processor coupled to the electric motor and the inverter, the at least one processor being configured to:
modify a signal controlling the power inverter utilizing a first voltage distortion compensation method if a modulation index of the signal is less than a first modulation index value;
modify the signal utilizing a second voltage distortion compensation method if the modulation index is at least equal to the first modulation index value;
modify the signal utilizing a third voltage distortion compensation method if the modulation index is at least equal to a second modulation index value, the second modulation index value being greater than the first modulation index value and a switching frequency of the power inverter is at a maximum value; and
modify the signal utilizing the first voltage distortion compensation method if the modulation index is at least equal to the second modulation index value and the switching frequency of the power inverter is not at the maximum value.

14. The automotive electric drive system of claim 13, wherein:
the signal is a first signal having a duty cycle and the first voltage distortion compensation method comprises:
receiving the first signal, the duty cycle of the first signal having a range from a minimum achievable duty cycle to a maximum achievable duty cycle;
producing a second signal if the duty cycle of the first signal is within the output voltage distortion range and less than a first clipping value, the second signal having the minimum achievable duty cycle;
producing a third signal if the duty cycle of the first signal is within the output voltage distortion range and one of the duty cycle of the first signal is at least equal to the first clipping value or the duty cycle of the first signal is not greater than a second clipping value, the third signal having a closer one of the minimum and maximum pulse widths to the duty cycle of the first signal, the second clipping value being greater than the first clipping value;
producing a fourth signal if the duty cycle of the first signal is within the output voltage distortion range and greater than the second clipping value, the fourth signal having the maximum achievable duty cycle; and transmitting one of the second, third, and fourth signals to the power inverter;

the power inverter has a switching cycle with a plurality of phase legs and a zero vector and the second voltage distortion compensation method comprises:

monitoring an output voltage vector of the power inverter, the output voltage vector being based on the switching cycle of the power inverter;

producing a modified switching cycle by modifying a duty cycle of each of the plurality of phase legs by a duty cycle of the zero vector when the output voltage vector is in a distortion region; and providing a signal to the power inverter, the signal having the modified switching cycle; and the third voltage distortion compensation method comprises:

determining a duty cycle limit based on the first signal;

limiting the first signal to the duty cycle limit when the modulation index is greater than a minimum modulation index value to produce an output signal; and transmitting the output signal to the power inverter.

* * * * *